UNITED STATES PATENT OFFICE.

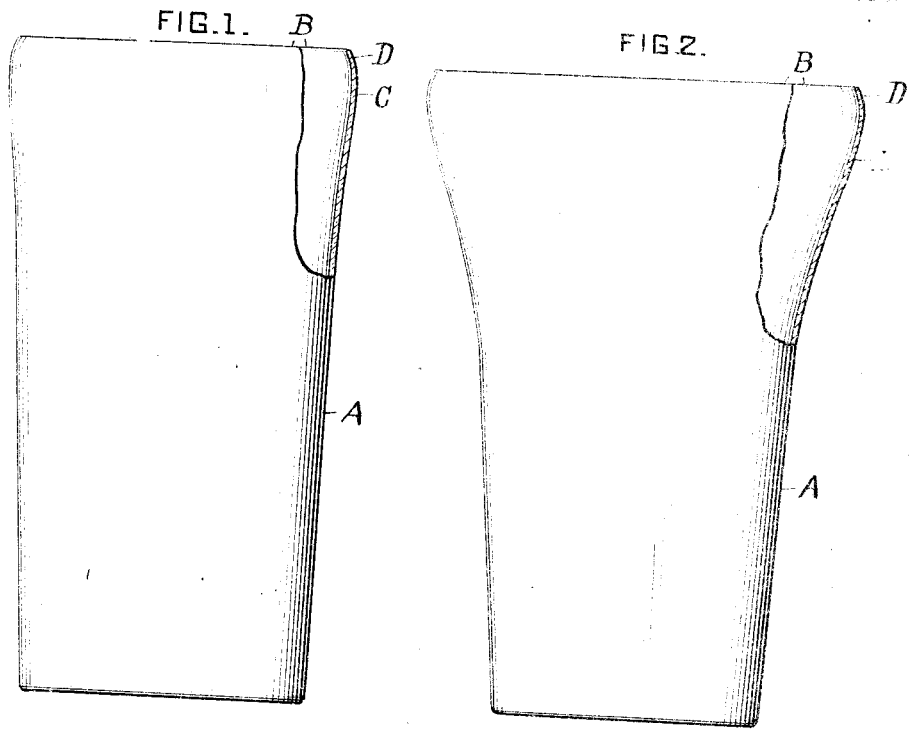
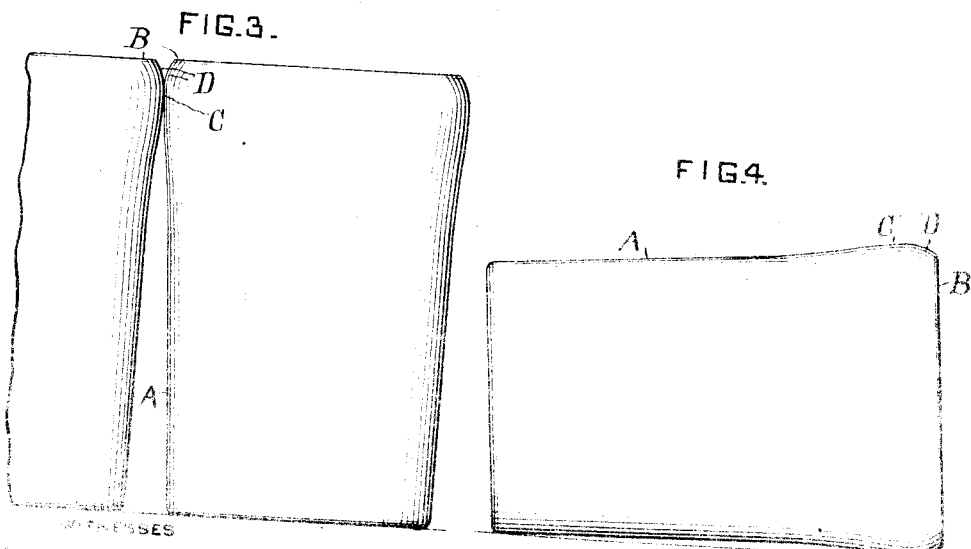

FREDERICK E. ANDERSON, OF PITTSBURGH, PENNSYLVANIA, ASSIGNOR TO UNITED STATES GLASS COMPANY, OF PITTSBURGH, PENNSYLVANIA, A CORPORATION OF PENNSYLVANIA.

DRINKING-GLASS.

1,128,216.

Specification of Letters Patent. Patented Feb. 9, 1915.

Application filed March 2, 1914. Serial No. 821,880.

*To all whom it may concern:*

Be it known that I, FREDERICK E. ANDERSON, a citizen of the United States, and resident of Pittsburgh, in the county of Allegheny and State of Pennsylvania, have invented certain new and useful Improvements in Drinking-Glasses, of which the following is a specification.

It is a well recognized condition in that portion of the glass trade having to do with the manufacture and marketing of drinking glasses or tumblers blown in paste molds that they chip on the top edge or lip, and this chipping results in much waste in those uses where the glassware is closely watched for the removal from service of marred pieces. Where servers of beverages are less particular a drinking glass without a chipped edge is the exception rather than the rule. "Punch" ware, *i. e.*, thin blown glasses which are made in paste molds, is particularly susceptible to chipping due to its fragile nature and to the fact that the top edge is usually the portion most exposed, in many lines or shapes the glasses being of greatest diameter at their top edge. With a number of such glasses closely assembled, as on a bar, or a soda water counter, and even as such glasses are assembled for home use, the edges of adjacent glasses strike together when moved or jarred, or when a glass is being placed among other glasses on a bar or counter, and as comparatively little force or concussion is required to chip one or both contacting edges, chipping is prevented only by the most painstaking care, and of course such care is not ordinarily observed, and in fact cannot be in busy places where quick handling of glasses is necessary. Also, considerable chipping and no little complete breakage results from the glasses tipping or falling over and striking their unprotected edges on the bar, counter, or other support.

The object herein is to overcome this chipping by so forming the glass that the heretofore edge-damaging force is transmitted to the glass beneath its top edge and at a point where the force or blow will not be harmful. This is accomplished by so shaping the glass that the maximum diameter of its top or lip edge is slightly less than the outside diameter immediately beneath the top edge, but with the difference in diameters so slight as to be scarcely noticeable, insufficient to mar or distort the design or shape of the glass as a whole. Also, this very slight diameter difference is not sufficiently marked to retard the normal use of the glass or to prevent it from being completely drained, nor is the formation in question such as to provide a lodgment for matter to accumulate, so that glasses embodying the invention may be cleaned as readily as though of usual form, and in fact may be more thoroughly cleaned and with greater safety than glasses having chipped edges.

The invention may be applied to drinking glasses varying widely in shape and size.

In the accompanying drawings, Figure 1 is a view partly in elevation and partly in section of a "straight" tumbler embodying the invention, and Fig. 2 is a similar view of a bell tumbler. Fig. 3 is an elevation of two of the improved tumblers standing and in contact, and Fig. 4 shows one of the tumblers tipped over as on a bar or counter.

Referring to the glass illustrated in Fig. 1, A designates the upright annular side wall thereof, and B the top edge or lip. Instead of the side wall being straight as is commonly the case with glasses of this form, a vertical section thereof shows the upper portion of the wall formed with a very slight and gradual bulge as indicated at C, and the extreme upper portion of this bulge is deflected inward slightly at D, such deflection terminating in the edge B. This is only one of various formations available for forming the maximum diameter of the edge B less than the outside diameter of the portion of the wall immediately beneath the edge. An advantage of this particular formation is that the diameter of the top edge is the same as it would be in the absence of the present improvement, and is the normal diameter of a glass of the general shape illustrated. This feature is in keeping with an important trade condition that requires all the glasses of a given type and size to match as to top diameter, bottom diameter and height. It also facilitates nesting the glasses. If the edge were simply drawn in without the outward bulge, the wedging resulting from nesting would be liable to break the edge; also such construction would be objectionable as the deflected edge would be more pronounced and less effective than obtained by the seemingly slight but all-sufficient cupping resulting from the bulge.

The short deflection D which merges into edge B is preferably convex on its exterior and concave on its interior, the very slight cupping resulting from this formation being conducive to easy and thorough cleaning and not interfering with fully draining the contents of the glass.

The "bell" tumbler illustrated in Fig. 2 also embodies the slight concavo-convex top deflection D terminating in edge or lip B, in this form said deflection being simply a reversal of the curvature of the bell-like bulge E. This form of glass is largely used at soda fountains, its shape being well suited for ice cream sodas, and when formed in the ordinary way the projecting edge of its belled upper portion is particularly exposed and even more vulnerable to chipping than the so-called straight glasses. But when constructed in accordance with the present improvement, the edge is fully protected not only from striking other glasses when arranged side by side, but also from striking its edge when upset on a bar or counter.

The described shapes are merely illustrative of thin blown glasses of various forms to which the invention may be applied. Regardless of the shape of the glass, its thickness, or its method of manufacture, it is characteristic of the invention that it affects only the extreme top portion, and its effect there is so slight as to be scarcely noticeable to the eye, and in no way detracts from the general shape or contour of the glass. Thus the improvement may be applied to standard or stock shapes, or to special shapes, without materially interfering with or changing the lines thereof.

The location of the very slight deflection immediately beneath the edge or lip of the glass distinguishes the invention from those forms of tumblers or drinking glasses whose bodies are bulged or enlarged in the development of designs for producing various configurations or shapes. While the bulged bodies of such drinking glasses may serve to protect from chipping the edge or lip in at least some uses, such protection is only accidental or an incident to the particular design, and is not so closely adjacent to the edge as to protect the latter under all conditions of jarring contact and overtipping; and furthermore, such body bulge is inherent to the shape or configuration of the glass to which it is applied and is not so inconspicuous and almost unnoticeable that it may be embodied in any and all forms of glasses without interfering with the shape or configuration scheme thereof.

I claim:—

A drinking glass of conventional shape or outline from its bottom upwardly to a line adjacent to its top edge and from said line departing from the conventional shape in a slight outward bulge with the upper portion of the bulge disposed inwardly to provide a vertically shallow inwardly deflected edge-carrying lip without interfering with the conventional shape of the glass as a whole, as described.

In testimony whereof I affix my signature in presence of two witnesses.

FREDERICK E. ANDERSON.

Witnesses:
J. M. NESBIT,
F. E. GAITHER.